United States Patent
Ling et al.

(10) Patent No.: US 8,627,201 B2
(45) Date of Patent: Jan. 7, 2014

(54) METHOD FOR GENERATING SIMPLE OBJECT ACCESS PROTOCOL MESSAGES AND PROCESS ENGINE

(75) Inventors: Jin Ling, Haidian District (CN); Liang Liu, Haidian District (CN); Ping Pan, Haidian District (CN); Qi Ming Tian, Haidian District (CN)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/512,200

(22) Filed: Jul. 30, 2009

(65) Prior Publication Data

US 2010/0031138 A1    Feb. 4, 2010

(30) Foreign Application Priority Data

Jul. 30, 2008  (CN) .......................... 2008 1 0129997

(51) Int. Cl.
*G06F 3/00*    (2006.01)
(52) U.S. Cl.
USPC ........................................... 715/239; 715/234
(58) Field of Classification Search
USPC ........................ 715/234, 243, 254, 255, 239
See application file for complete search history.

(56) References Cited

U.S. PATENT DOCUMENTS

| 2007/0136435 A1* | 6/2007 | Lee et al. ...................... 709/213 |
| 2008/0109524 A1* | 5/2008 | Meadows et al. ............. 709/207 |
| 2009/0064175 A1* | 3/2009 | Taylor et al. .................. 719/313 |

OTHER PUBLICATIONS

Weihai Yu, Toward a Lightweight Process-Aware Middleware, APWeb/WAIM 2007 Ws, LNCS 4537, pp. 497-503, 2007.
Marcel-Cătălin Roșu, A-SOAP: Adaptive SOAP Message Processing and Compression, 2007 IEEE International Conference on Web Services (ICWS 2007).
Ranjit Mulye, METEOR-S Process Design and Development Tool (PDDT), University of Georgia Computer Science Department.
Adrian Giurca, et. al.,Modeling Web Services with URML, Brandenburg University of Technology, May 15, 2006.
Charles Petrie, Service Agents and Virtual Enterprises: A Survey, IEEE Intenet Computing, Special issue on "Business Processes on the Web", Jan./Feb. 2004.

* cited by examiner

*Primary Examiner* — Kyle Stork
(74) *Attorney, Agent, or Firm* — Thomas Grzesik; Fleit Gibbons Gutman Bongini & Bianco PL

(57) ABSTRACT

A method for generating a Simple Object Access Protocol (SOAP) message in XML during execution of a process in a SOA-based process engine apparatus and a corresponding process engine apparatus. The method includes: generating and storing an XML character string containing a fixed SOAP message skeleton; generating and storing an XML character string containing an instance-constant variable; generating an XML character string containing a dynamic variable; and concatenating the XML character string containing the fixed SOAP message skeleton and the XML character string containing the instance-constant variable as previously stored and the XML character string containing the dynamic variable by a character string concatenating operation to generate a SOAP message. A process engine apparatus including a message analyzer unit, a message pre-composer unit, a character string depository, and a message composer unit is also provided.

8 Claims, 8 Drawing Sheets

Par1:
Head String =

```
<?xml version="1.0" encoding="utf-*"?>
<soap:Envelope xmlns:soap=http://schemas.xmlsoap.org/soap/envelope/
    xmlns:soapenc=http://schemas.xmlsoap.org/soap/encoding/
    xmlns:xsl=http://www.w3.org.2001/XMLSchema-instance
    xmlns:xsd=http://www.w3org/2001/XMLSchema
    xmlns:tns=http://anyuri.org/
    xmlns:types=http://anyuri.org/encodedTypes>
  <soap:Body soap:encodingStyle="http://schemas.xmlsoap.org/soap/encoding/"
    <PX:getLocation xmlns:PX="http://www.parlay.org">
      <phonenumber href="#id1" />
      <accuracy href="#id2" />
    </PX:getLocation>
```

Par1:
Tail String =

```
  </soap:Body>
</soap:Envelope>
```

Par2:InstanceConstantVar1 = "Var_PhoneNumber"
Par2:InstanceConstantVar2 = ......

Par3:Var1 = "Var_Accuracy"
Par2:Var2 = ...

FIG. 8

Var_PhoneNumber = `<types:PhoneNumber id="id1" xsi:type="types:PhoneNumber">+8613812345678</types:PhoneNumber>`

FIG. 9

Var_UserType = `<types:UserType id="id3" xsi:type="types:UserType">GoTone</types:UserType>`

Var_Accuracy = `<types:Accuracy id="id2" xsi:type="types:Accuracy">10m</types:Accuracy>`

Request message to be output to service C requestMessage = Par1: HeadString + Par2:InstanceConstantVar1 + Par3: Var1 + Par1: TailString
= Par1: HeadString + Var_phoneNumber + Var_Accuracy + Par1: TailString

FIG. 11

METHOD FOR GENERATING SIMPLE OBJECT ACCESS PROTOCOL MESSAGES AND PROCESS ENGINE

CROSS-REFERENCE TO RELATED APPLICATIONS

This application claims priority under 35 U.S.C. §119 from Chinese Patent Application No. 200810129997.5, filed Jul. 30, 2008, the entire contents of which are incorporated herein by reference.

FIELD OF THE INVENTION

The present invention generally relates to the field of Web services and, in particular, to process engine technologies based upon the Service-Oriented Architecture (SOA).

BACKGROUND OF THE INVENTION

In recent years, Web service technologies have advanced rapidly along with speedy development of computer and network technologies. Web service technologies have become a predominant technology foundation and platform for development of applications. Web services have been supported by major corporations in the industry, e.g., IBM, Microsoft, BEA, etc., due to their advantages of easy encapsulation, loose coupling, utilization of standard protocol specifications and the ability of being highly integrated. International standardization organizations including the World Wide Web Consortium (W3C), the Organization for the Advancement of Structured Information Standards (OASIS), have established several standard specifications to thereby impel rapid development of relevant technologies and applications. A Web service which is a stand-alone modular application describes operations to be executed or data to be exchanged with another Web service using protocols based on the eXtensible Markup Language (XML) and typically fails to satisfy operation requirements of a business process by itself. In order to cater to increasingly complex and changing business requirements, Web services are needed to be linked together into a business process to achieve a more sophisticated function. A business process specifies a possible order in which operations of a set of Web services are executed, data shared among these Web services, and is executed automatically by a process execution engine for achieving automation as much as possible.

SOA-based process engines have been in increasingly wide use along with development of Web technologies. More and more enterprises or corporations disclose complex systems as Web services and automate business processes by means of process engines. These process engines usually guide execution of processes with use of the Business Process Execution Language (BPEL) and describe services with use of the Web Service Description Language (WSDL). The BPEL is an XML-based work flow definition language, which was initially developed jointly by Microsoft, IBM and BEA. It has a basic function of choreography and coordinating of Web services to deploy their cooperative and transactional behaviors. The BPEL describes internal processes of an enterprise in XML so that business processes originally established on different products can also enable across-platform intercommunicating in the same way as Web services do. When a process engine is intended to execute a work flow described in the developed BPEL, or more particularly described in the Business Process Execution Language for Web Services (BPEL4WS), the process engine usually needs to invoke atomic services or external services provided by various Web service providers or various platforms or systems. In the case of utilizing a SOA solution and the BPEL4WS, invoking of several Web services often occurs in a process instance and business process choreographies are widely adopted in enterprise systems.

When invoking a Web service, request and response messages are always Simple Object Access Protocol (SOAP) messages. Multi-round composition and decomposition of SOAP messages will inevitably occur in a business process. That is to say, composition and decomposition of SOAP messages are the basis of invoking of a Web service, and composition of SOAP messages in the XML will occur many times in a process instance. In many existing process engines, all SOAP messages in a process instance are composed independently during execution of the process. However, composition of SOAP messages in the XML is a very frequently occurring and time-consuming character string processing task. That is, composition of SOAP messages is one of major causes resulting in delay in invoking a business process. Moreover, at the service level, a long response time to a Web service may degrade satisfaction of customers, and the Web service often cannot be offered to a sufficient number of concurrent users due to limited resources. Therefore, it is highly desirable to address the problem of how to enable a process engine to reduce the time required for composition of SOAP messages during the execution of a process, thereby optimizing performance of the process engine.

SUMMARY OF THE INVENTION

In order to address the above problem in the prior art, an object of the invention is to provide a method for generating a SOAP message during execution of a business process that can reduce the time required for generating the SOAP message by simple concatenation of character strings in place of conventional composition of the SOAP message and thereby optimize performance of a process engine. Another object of the invention is to provide a process engine improved in performance, which replaces conventional composition of a SOAP message with simple concatenation of character strings so that the time required for generating the SOAP message can be reduced significantly and hence performance of the process engine can be optimized.

Accordingly, the present invention provides a method for generating a Simple Object Access Protocol (SOAP) message in eXtensible Markup Language (XML) during execution of a process in a process engine apparatus based upon Service-Oriented Architecture (SOA), which process includes the steps of: generating an XML character string containing a fixed SOAP message skeleton using a message analyzer unit in the process engine apparatus; storing the XML character string containing the fixed SOAP message skeleton in a character string depository in the process engine apparatus; generating an XML character string containing an instance-constant variable using a message pre-composer unit in the process engine apparatus; storing the XML character string containing the instance-constant variable in the character string depository in the process engine apparatus; generating an XML character string containing a dynamic variable using a message composer unit in the process engine apparatus; and concatenating (i) the XML character string containing the fixed SOAP message skeleton, (ii) the XML character string containing the instance-constant variable and (iii) the XML character string containing the dynamic variable using a character string concatenating operation in the message composer unit to generate the SOAP message.

The present invention provides a process engine apparatus based upon Service-Oriented Architecture (SOA), including: a message analyzer unit configured to analyze a Simple Object Access Protocol (SOAP) message in eXtensible Markup Language (XML) that is generated during execution of a process and generate an XML character string containing a fixed SOAP message skeleton; a message pre-composer unit configured to generate an XML character string containing an instance-constant variable; a character string depository configured to store the XML character string containing the fixed SOAP message skeleton generated by the message analyzer unit and the XML character string containing the instance-constant variable generated by the message pre-composer unit; and a message composer unit configured to (i) generate an XML character string containing a dynamic variable, (ii) retrieve from the character string depository the XML character string containing the SOAP message skeleton and the XML character string containing the instance-constant variable, and (iii) concatenate all the XML character strings to generate a SOAP message.

The present invention improves upon the conventional method of composing a SOAP message by using a light-weight XML character string concatenating operation and thereby optimizing the performance of the process engine.

Other features and advantages of the invention will become more apparent from the following detailed description of preferred embodiments of the invention with reference to the accompanying drawings.

BRIEF DESCRIPTION OF THE DRAWINGS

The invention can be better understood with reference to the description given below in conjunction with the accompanying drawings, throughout which identical or like components are denoted by identical or like reference signs, and together with which the following detailed description are incorporated into and form a part of the specification and serve to further illustrate preferred embodiments of the invention and to explain principles and advantages of the invention. In the drawings:

FIG. 8 shows an example of a SOAP message skeleton generated for the service C during execution of the procedure as shown in FIG. 5;

FIG. 9 shows an example of an XML character string containing an instant-constant variable, which is generated during execution of the procedure as shown in FIG. 6;

FIG. 10 shows an example of an XML character string containing a dynamic variable, which is generated for the service C during execution of the procedure as shown in FIG. 7; and FIG. 11 shows the manner in which character strings are concatenated in order to obtain a SOAP message for invoking the service C (i.e., a request message to be output to the service C) during execution of the procedure as shown in FIG. 7.

DETAILED DESCRIPTION OF THE INVENTION

Figure 1:
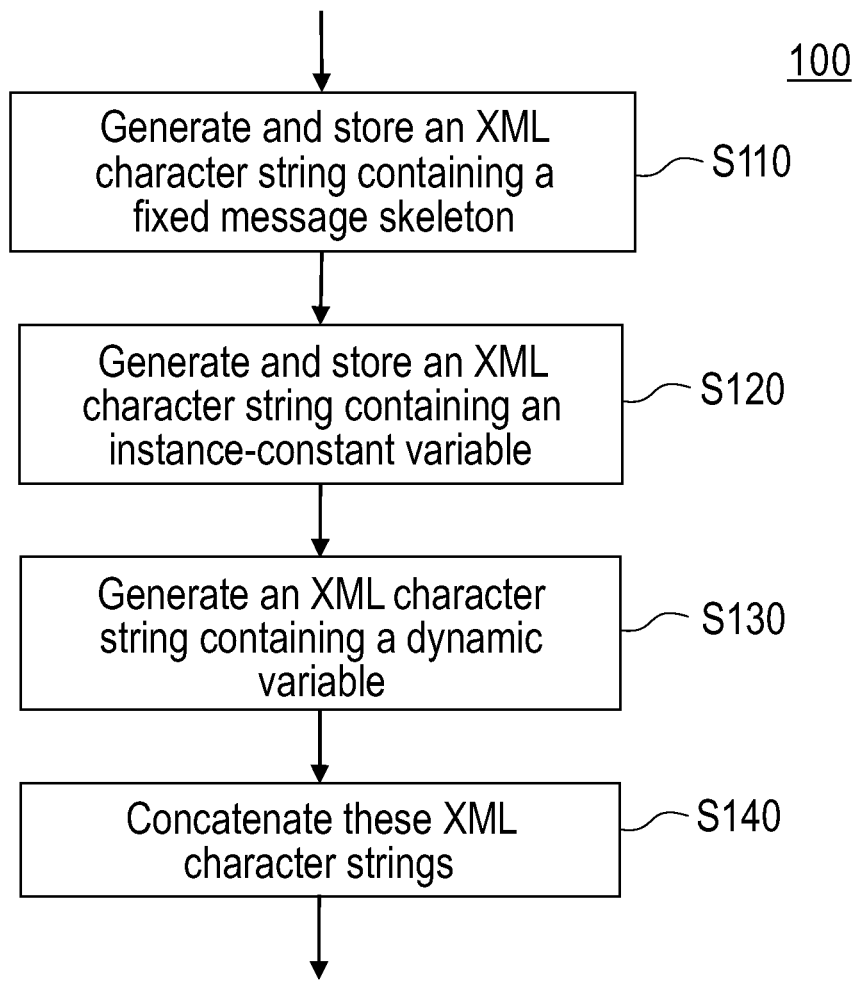
FIG. 1 shows a flow chart of a method for generating a SOAP message by a character string concatenating operation in a process engine according to an embodiment of the invention.

The inventors have found during optimizing a process engine that, the majority of contents in a SOAP message resulting from being composed many times during invoking of a Web service are completely identical for all SOAP messages involved in one and the same process and therefore can be referred to as a process-constant variable, a part of the contents are identical for the same process instance but vary from one process instance to another and therefore can be referred to as an instance-constant variable, and the remaining part of the contents vary from one SOAP message to another and therefore can be referred to as a dynamic variable for the sake of simplicity.

Therefore, in view of this finding described above, it can be considered that each SOAP message to be output from a process engine may be divided into three parts which can be generated at different points of time as required. Particularly, the first part is a fixed SOAP message skeleton containing a process-constant variable and may be generated, for example, at the time of deployment of a BPEL script onto the process engine; the second part contains a instance-constant variable and may be generated, for example, at the time of initialization of a process instance; and the third part contains a dynamic variable and may be generated, for example, prior to transmission of the SOAP message.

In view of the above, in order to attain the above objects of the invention, there is provided according to an aspect of the invention a method for generating a SOAP message in the XML during execution of a process in a SOA-based process engine, which includes the following steps: generating and storing an XML character string containing a fixed SOAP message skeleton; generating and storing an XML character string containing an instance-constant variable; generating an XML character string containing a dynamic variable; and concatenating the XML character string containing the fixed SOAP message skeleton and the XML character string containing the instance-constant variable as previously stored and the XML character string containing the dynamic variable by a character string concatenating operation to generate a SOAP message.

According to another aspect of the invention, there is further provided a SOA-based process engine including: a message analyzer adapted to analyze a SOAP message in the XML to be generated during execution of a process and generate an XML character string containing a fixed SOAP message skeleton; a message pre-composer adapted to generate an XML character string containing an instance-constant variable; a character string depository adapted to store the XML character string containing the fixed SOAP message skeleton generated by the message analyzer and the XML character string containing the instance-constant variable generated by the message pre-composer; and a message composer adapted to generate an XML character string containing a dynamic variable, retrieve from the character string depository the XML character string containing the SOAP message skeleton and the XML character string containing the instance-constant variable, and then concatenate all the XML character strings to generate a SOAP message.

According to other aspects of the invention, there are further provided a corresponding computer readable storage medium and a corresponding computer program product.

Exemplary embodiments of the present invention will be described in conjunction with the accompanying drawings hereinafter. For the sake of clarity and conciseness, not all the features of actual implementations are described in the specification. However, it is to be appreciated that, during developing any of such actual implementations, numerous implementation-specific decisions must be made to achieve the developer's specific goals, for example, compliance with system-related and business-related constraints which will vary from one implementation to another. Moreover, it is also to be appreciated that, such a development effort might be very complex and time-consuming, but may nevertheless be a routine task for those skilled in the art having the benefit of this disclosure.

It shall further be noted that only device structures and/or processing steps closely relevant to solutions of the invention will be illustrated in the drawings while omitting other details less relevant to the invention so as not to obscure the invention due to those unnecessary details.

FIG. 1 shows a flow chart of a method 100 for generating a SOAP message by a character string concatenating operation in a process engine according to an embodiment of the invention. Here, the procedure of the method 100 will be explained by taking a business process described in the BPEL as an example. However, those skilled in the art shall appreciate that the method 100 according to the embodiment of the invention will not be limited only to a business process in the BPEL but can also be applicable to business processes described in other languages such as BPEL4WS, SCXML (State Chart XML) and so on.

As shown in FIG. 1, at step S110, an XML character string containing a fixed SOAP message skeleton is generated based upon the definition of a process and stored, for example, in a character string depository inside a process engine. The processing of step S110 may be executed at the time of deploying a BPEL script onto the process engine. However, those skilled in the art shall appreciate that the processing of this step may also be executed later as long as the XML character string containing the SOAP message skeleton is generated prior to initialization of a process instance. Here, the SOAP message skeleton contains a process-constant variable, e.g., a message head of a SOAP message, which is identical for all SOAP messages in one and the same business process.

Next, at step S120, an XML character string containing an instance-constant variable is generated and stored in the character string depository. The processing of step S120 can be executed, for example, at the time of initializing a process instance. Here, the instance-constant variable is identical for one and the same process instance and can include a global variable, e.g., user ID, etc.

Thereafter, at step S130, an XML character string containing a dynamic variable is generated. The processing of step S130 can be prior to transmission of the SOAP message, for example. Here, the dynamic variable refers to any variable in the SOAP message, which varies from one SOAP message to another.

Then, at step S140, the XML character string containing the fixed SOAP message skeleton and the XML character string containing the instance-constant variable, which were previously stored, are retrieved from the character string depository and concatenated with the XML character string containing the dynamic variable, which was generated at step S130, to thereby obtain the complete SOAP message to be output. The processing of step S140 can be executed prior to transmission of the SOAP message.

Figure 2:
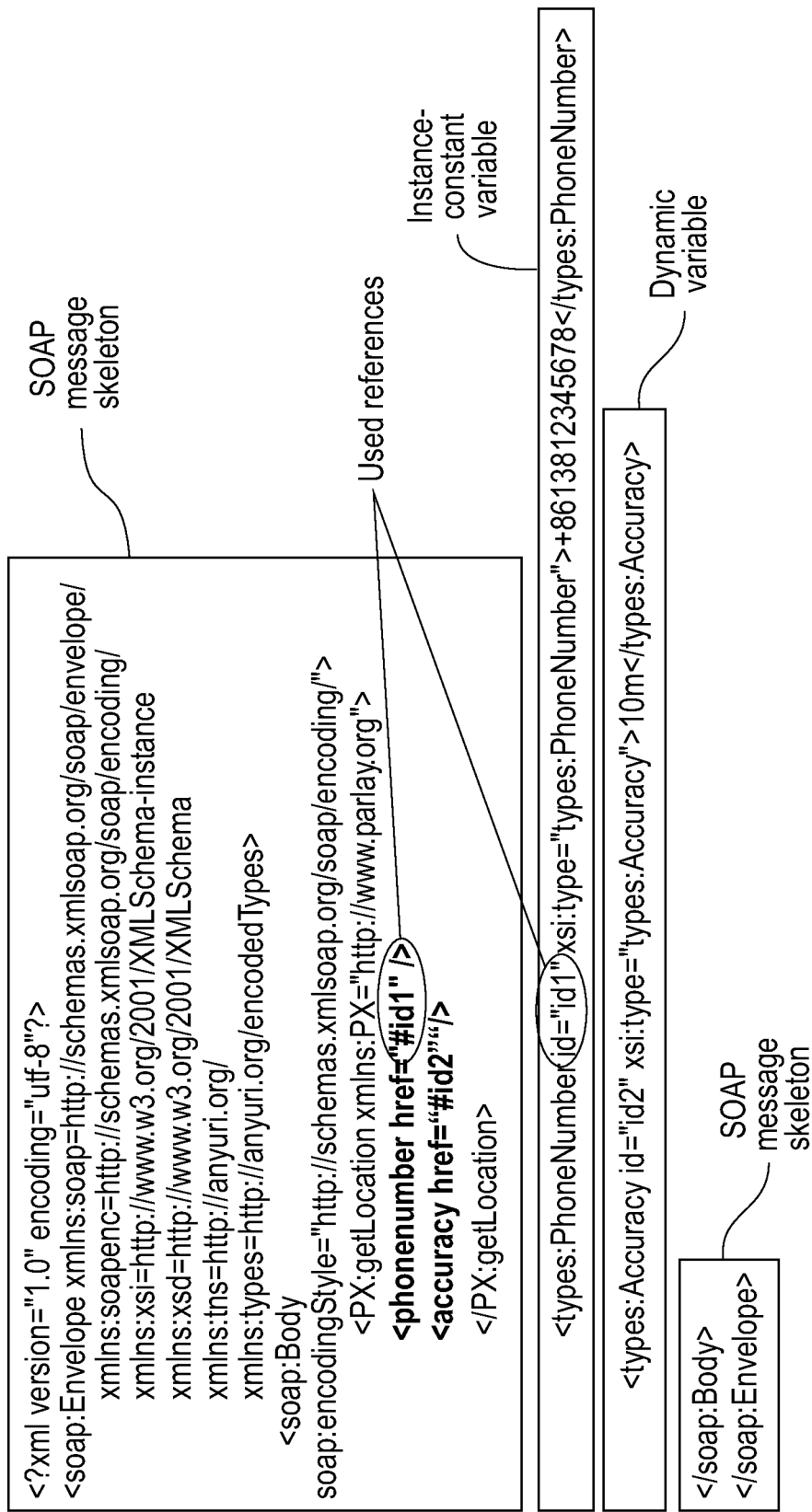
FIG. 2 shows an example of a SOAP message obtained in the method shown in FIG. 1.

FIG. 2 shows an example of a SOAP message obtained from concatenation of the character strings in the method 100 shown in FIG. 1. As can be apparent from FIG. 2, the SOAP message can be divided into one part of the fixed message skeleton and the other varying for the process. For example, the SOAP message can be divided by means of a standard reference method or structure (i.e., a reference mechanism) provided in the XML, and the SOAP message can be obtained by concatenating (i) the XML character string containing the SOAP message skeleton, (ii) the XML character string containing the instance-constant variable and (iii) the XML character string containing the dynamic variable.

Although the reference mechanism provided in the XML is used in the example of the SOAP message as shown in FIG. 2, those skilled in the art shall appreciate that the SOAP message can be divided into the fixed part and the varying parts by using other similar methods or structures.

Figure 3:
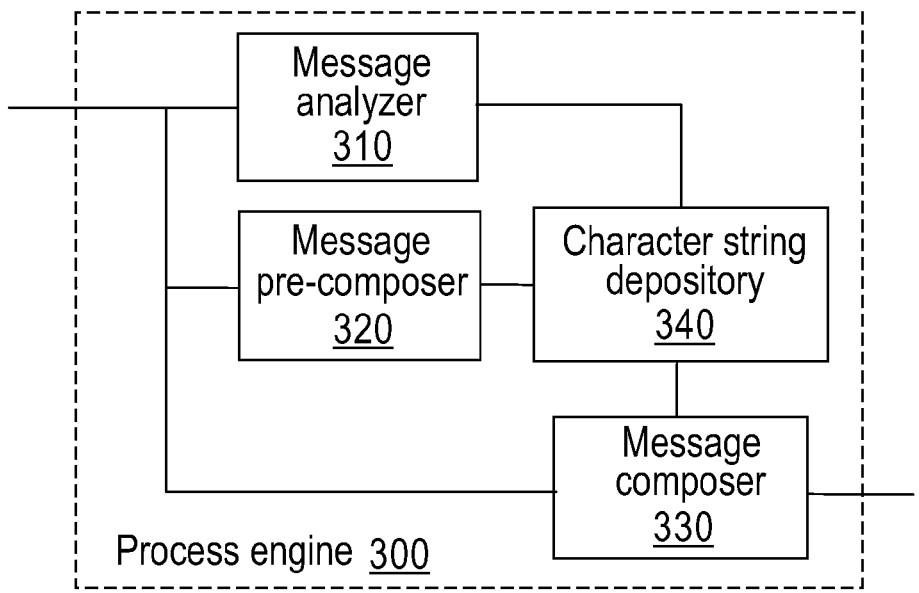
FIG. 3 shows a schematic block diagram of a process engine according to an embodiment of the invention.

FIG. 3 shows a schematic block diagram of a process engine 300 according to an embodiment of the invention. Only components closely relevant to the invention are shown for conciseness. The method 100 described above with reference to FIG. 1 can be implemented in the process engine 300 to reduce the time required for composing a SOAP message frequently and thereby optimize performance of the process engine.

As shown in FIG. 3, the process engine 300 includes: a message analyzer; message pre-composer; a message composer; and a character string depository. The message analyzer 310 is adapted to analyze a SOAP message that can be generated during deployment of a BPEL script, and generate an XML character string containing a fixed SOAP message skeleton. The message pre-composer 320 is adapted to generate an XML character string containing an instance-constant variable, for example, during initialization of a process instance upon arrival of a new request from a user at the process engine. The character string depository 340 is adapted to store the XML character string containing the fixed SOAP message skeleton that is generated by the message analyzer 310, and the XML character string containing the instance-constant variable that is generated by the message pre-composer 320. The message composer 330 is adapted to generate an XML character string containing a dynamic variable for a Web service to be invoked prior to transmission of a SOAP message for invoking the Web service, retrieve from the character string depository 340 the XML character string containing the SOAP message skeleton and the XML character string containing the instance-constant variable as stored for the Web service, and then concatenate all the XML character strings for the Web service and thereby obtain the SOAP message for transmission.

For a better explanation of the method and the process engine according to the embodiments of the invention described above with reference to FIG. 1 and FIG. 3, the processing or operation procedure of the method 100 and the process engine 300 will be further detailed below by taking a business process shown in FIG. 4 as an example and with reference to the schematic diagrams shown in FIGS. 5 to 7.

Figure 4:
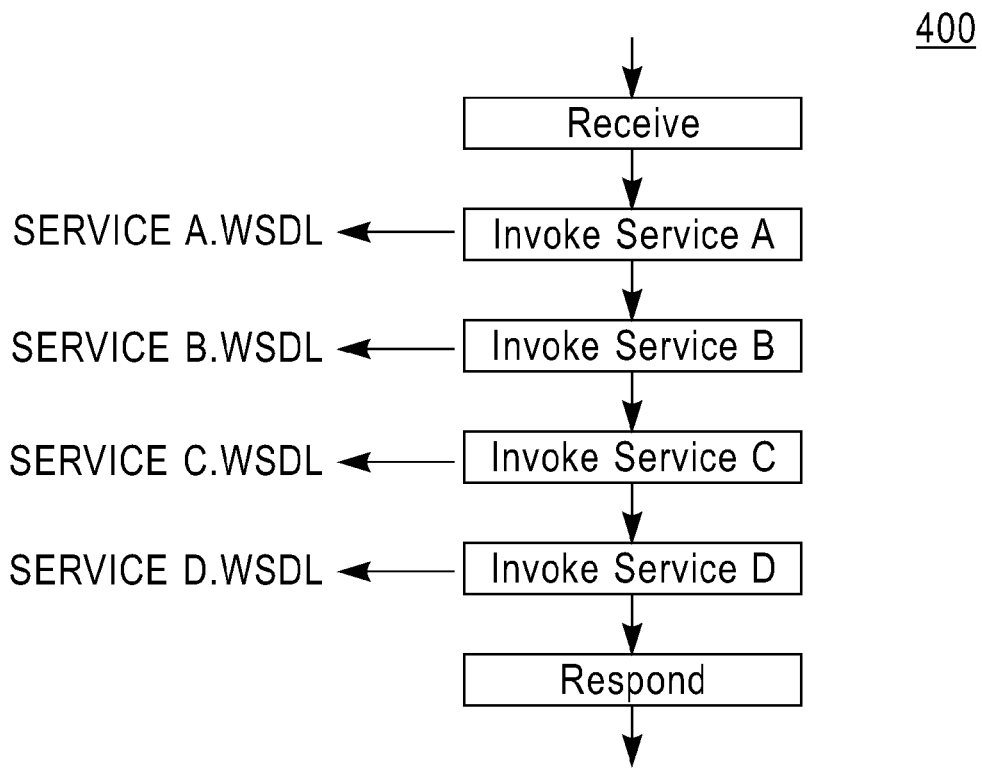
FIG. 4 shows an example of definition of a typical and simple business process.

FIG. 4 shows an example 400 definition of a typical and simple business process. Web services A, B, C and D (simply referred hereinafter to four nodes A, B, C and D in the business process, respectively) are to be invoked sequentially and WSDL files for the services can be known and introduced into the business process 400 prior to designing.

After the business process is defined, SOAP messages to be transmitted to invoke the Web services A, B, C and D in the process (i.e., SOAP messages for the nodes A, B, C and D) thus have been determined and can be determined from the WSDL files for the services. Therefore, fixed parts (i.e., fixed SOAP message skeletons) in the SOAP messages for the respective nodes can be known prior to deployment of a BPEL script onto the process engine 300 by analyzing the SOAP messages.

Figure 5:
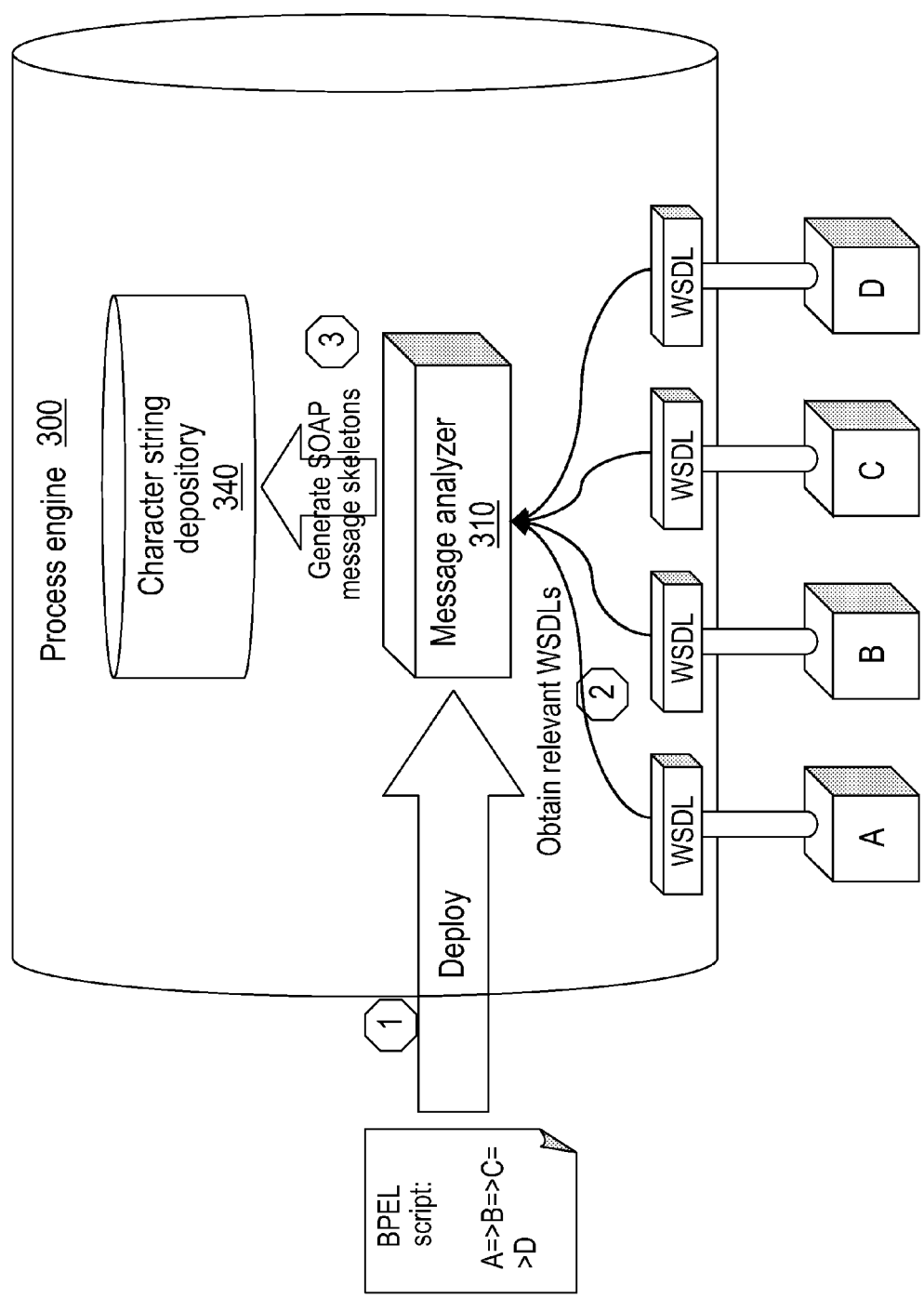
FIG. 5 shows a schematic diagram of a procedure of generating an XML character string containing a fixed SOAP message skeleton at the time of deploying a BPEL script onto the process engine shown in FIG. 3.

FIG. 5 shows a schematic diagram of a procedure of generating an XML character string containing a fixed SOAP message skeleton during deployment of a BPEL script onto the process engine 300 shown in FIG. 3. In FIG. 5, reference number 1 denotes that a BPEL script corresponding to the business process 400 shown in FIG. 4 is deployed onto the process engine, reference number 2 denotes that the message analyzer 310 obtains the WSDL files for the Web services A, B, C and D, and reference number 3 denotes that the message analyzer 310 generates XML character strings containing message skeletons of the SOAP messages for the respective nodes by analyzing the SOAP messages for the respective nodes and storing them in the character string depository 340 for use in a subsequent generation of the SOAP messages.

After the business process 400 is deployed onto the process engine 300, when there is a request for triggering a generation of a first instance of the process, those parts in the SOAP messages that are referred to by the respective nodes and keep unchanged in the flow of the process instance throughout the entire process can be analyzed and described in the corresponding character strings (containing an unique identifier and the respective referred-to part) with use of an XML reference mechanism.

Figure 6:
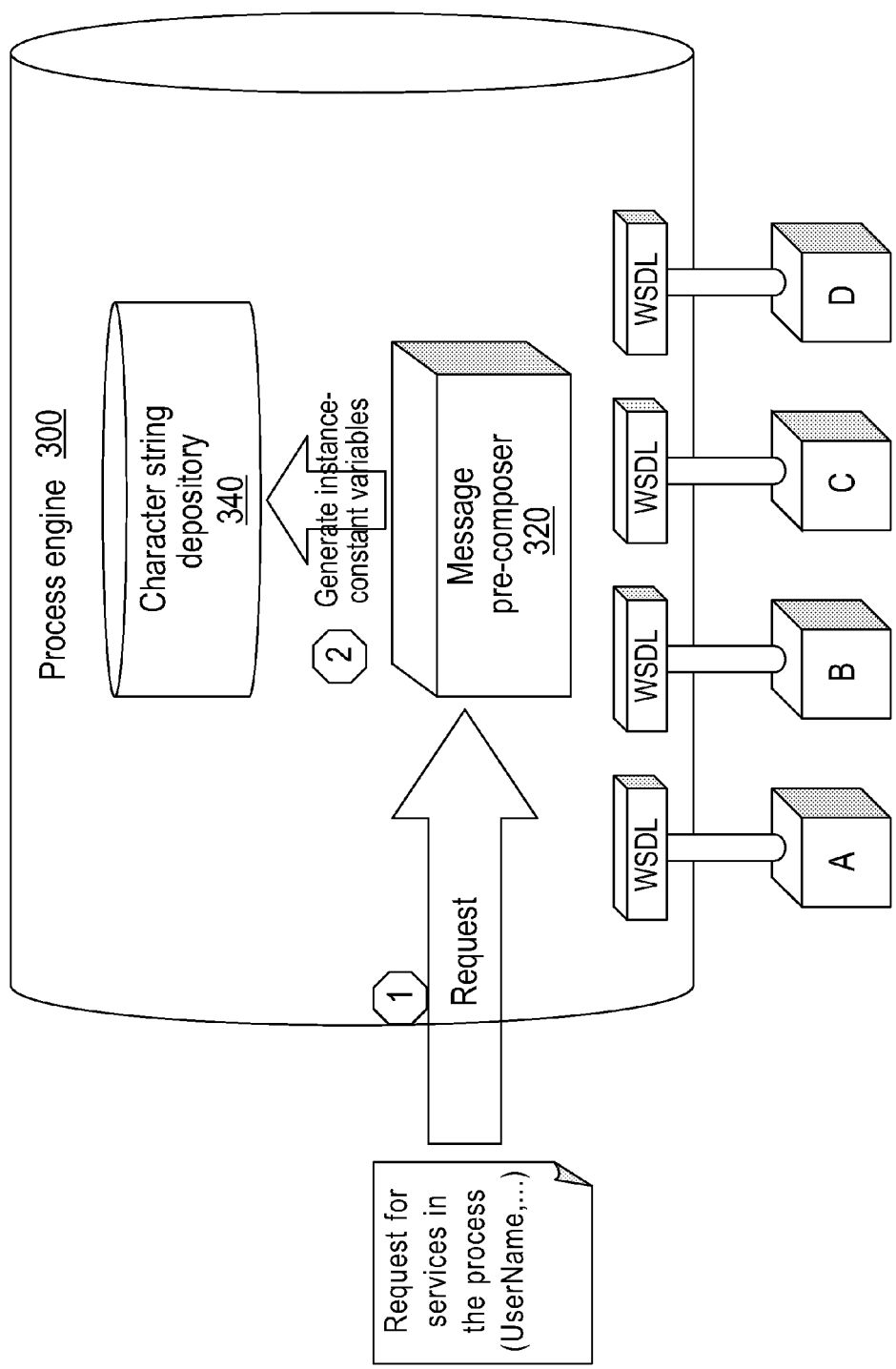
FIG. 6 shows a schematic diagram of a procedure of initializing a process instance on the process engine shown in FIG. 3.

FIG. 6 shows a schematic diagram of a procedure of initializing a process instance on the process engine 300 shown in FIG. 3. As shown in FIG. 6, reference number 1 denotes that the process engine 300 receives a request for the services in the process to trigger generation of a process instance, and reference number 2 denotes that the message pre-composer 320 generates XML character strings containing instance-constant variables and stores them in the character string depository 340 for use in subsequent generation of the SOAP messages.

When the process instance runs to arrive at a node, for example, where the service C is to be invoked and a SOAP message is to be transmitted thereto, the referred-to part (i.e., the XML character string containing the dynamic variable) is dynamically generated based upon the unique identifier assigned in the corresponding character string with use of the XML reference mechanism and in accordance with a return result of the previous invoking. A complete SOAP message packet is formed by concatenating (i) the XML character string containing the SOAP message skeleton and (ii) the XML character string containing the instance-constant variable for the service C, both of which are stored in the character string depository 340, and (iii) the generated XML character string containing the dynamic variable. The complete SOAP message packet is then transmitted to a corresponding invoking node.

Figure 7:
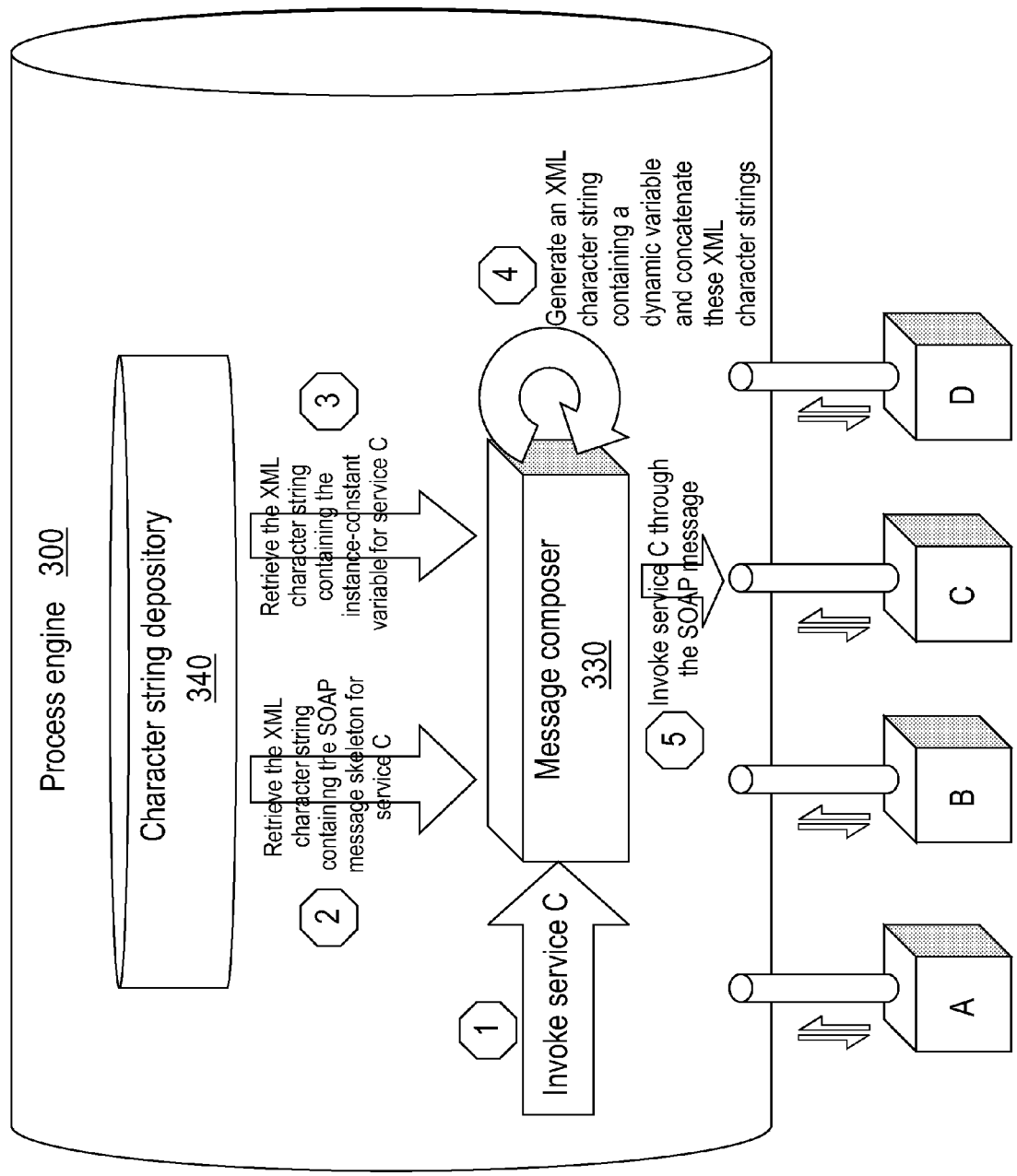
FIG. 7 shows a schematic diagram of a procedure when the process shown in FIG. 4 proceeds to ready for invoking a service C on the process engine shown in FIG. 3.

FIG. 7 shows a schematic diagram of a procedure where the process shown in FIG. 4 proceeds to invoke the service C on the process engine 300 shown in FIG. 3. As shown in FIG. 7, reference number 1 denotes that the process instance proceeds to invoke the service C, reference number 2 denotes that the message composer 330 retrieves from the character string depository 340 the XML character string containing the SOAP message skeleton for the service C, reference number 3 denotes that the message composer 330 retrieves from the character string depository 340 the XML character string containing the instance-constant variable for the service C, reference number 4 denotes that the message composer 330 generates the XML character string containing the dynamic variable for the service C and concatenates the XML character strings retrieved in steps 2 and 3 and the generated XML character string and thereby obtains a complete SOAP message, and reference number 5 denotes that the service C is invoked through the resulting SOAP message.

FIG. 8 shows an example of a SOAP message skeleton generated for the service C during execution of the procedure shown in FIG. 5. As shown in FIG. 8, "Par1" defines those parts in the SOAP message for the service C that are constant for the process, "Par2" defines instance-constant variables in the SOAP message for the service C, e.g., "Var_PhoneNumber", and "Par3" defines dynamic variables in the SOAP message for the service C, e.g., "Var_Accuracy".

FIG. 9 shows an example of an XML character string containing an instant-constant variable that is generated during execution of the procedure shown in FIG. 6. As shown in FIG. 9, global variables include, for example, "Var_PhoneNumber", "Var_UserType", etc.

FIG. 10 shows an example of an XML character string containing a dynamic variable ("Var_Accuracy" in this example), which is generated for the service C during execution of the procedure shown in FIG. 7.

FIG. 11 shows the manner in which character strings are concatenated to obtain a SOAP message for invoking the service C (i.e., a request message to be output to the service C) during execution of the procedure shown in FIG. 7. The complete SOAP message for the service C, as shown in FIG. 2, can be obtained after concatenating the respective character strings shown in FIG. 8, FIG. 9 and FIG. 10 in the manner of concatenating the character strings as shown in FIG. 11.

Using the method and/or the process engine according to the embodiments of the invention described above with reference to the accompanying drawings, a SOAP message can be obtained rapidly and easily by efficient concatenation of XML character strings by means of a standard reference mechanism in the XML. The method and process engine improve upon of the conventional composition of the SOAP message in the XML.

In the method and/or the process engine according to the embodiments of the invention, foreknowledge of a process for a specific service is utilized, and a light-weight character string concatenating operation is used to reduce delay in message encapsulation based upon the XML Document Object Model (DOM), which is especially effective during a multi-party interactive session and especially in the case that a SOAP message is needed to be composed many times.

Furthermore, the operation procedure of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device and then reading out and executing the program codes by a computer or center processing unit (CPU) of a system or device. At this time, as long as the system or device has a function of executing a program, implementing modes of the present invention are not limited to the program, and the program can be in any form including an object program, program executed by an interpreter, or script program provided to an operating system, etc. The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program codes.

An advantage of the invention lies in that, with use of the method for generating a SOAP message and/or the process engine according to the embodiments of the invention, conventional composition of a SOAP message can be replaced with a light-weight XML character string concatenating operation by means of foreknowledge of a process for a specific service, to thereby avoid multiple occurrences of SOAP message composition during execution of the process.

Another advantage of the invention lies in that, with use of the method and/or the process engine according to the embodiments of the invention, it is possible to reduce delay in message encapsulation based upon the XML Document Object Model (DOM).

Still another advantage of the invention lies in that, the method and/or the process engine according to the embodiments of the invention can be especially effective in a multiparty interactive session and can reduce greatly the time required for conventional composition of a SOAP message to thereby optimize significantly performance of the process engine.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

What is claimed is:

1. A method for generating a Simple Object Access Protocol (SOAP) message in eXtensible Markup Language (XML) during execution of a process in a process engine apparatus based upon Service-Oriented Architecture (SOA), the method comprising the steps of:
   analyzing a script describing a business process workflow of a business process;
   identifying, based on the analyzing, at least a first content set that is identical for a plurality of SOAP messages of the business process;
   generating, based on the identifying, a first XML character string comprising a fixed SOAP message skeleton comprising at least one process-constant variable corresponding to the first content set using a message analyzer unit in the process engine apparatus, wherein the first XML character string is generated during deployment of the script onto the process engine;
   storing the first XML character string comprising the fixed SOAP message skeleton in a character string depository in the process engine apparatus;
   identifying, based on the analyzing, at least a second set of content that is identical for one instance of the business process;
   generating, based on identifying the at least one instance-constant variable, a second XML character string comprising at least one instance-constant variable corresponding to the second content set using a message pre-composer unit in the process engine apparatus, wherein the second XML character string is generated during an initialization of the one instance of the business process, and wherein the instance-constant variable comprises a global variable;
   storing the second XML character string comprising the instance-constant variable in the character string depository in the process engine apparatus;
   generating a third XML character string comprising a dynamic variable using a message composer unit in the process engine apparatus, wherein the dynamic variable corresponds to at least one content set that varies in each SOAP message of the plurality of SOAP messages of the business process, wherein the third XML character string is generated prior to transmission of the SOAP message; and
   generating a SOAP message based on concatenating the first XML character string comprising the fixed SOAP message skeleton, the second XML character string comprising the instance-constant variable, and the third XML character string comprising the dynamic variable using a character string concatenating operation in the message composer unit.

2. The method according to claim 1, wherein the process engine apparatus is a Business Process Execution Language (BPEL) engine apparatus.

3. The method according to claim 1, wherein the SOAP message is divided into a first part for the fixed message skeleton and a second part for varying the process by means of a reference mechanism in the XML.

4. The method according to claim 1, wherein each of the XML character strings are generated based on a Web Service Description Language (WSDL) file of a Web service to be invoked in the process.

5. A process engine apparatus based upon Service-Oriented Architecture (SOA), comprising:
   a message analyzer unit configured to
      analyze a script describing a business process workflow of a business process;
      identify, based on the analysis of the script, at least a first content set that is identical for a plurality of SOAP messages of the business process; and
      generate, based on identifying the first content set, a first XML character string comprising a fixed SOAP message skeleton comprising at least one process-constant variable corresponding to the first content set, wherein the message analyzer unit generates the first XML character string during deployment of the script onto the process engine apparatus;
   a message pre-composer unit configured to
      identify, based on the analysis of the script, at least a second set of content that is identical for one instance of the business process; and
      generate a second XML character string comprising at least one instance-constant variable corresponding to the second content set, wherein the message pre-composer unit generates the second XML character string during an initialization of the one instance of the business process, and wherein the instance-constant variable comprises a global variable;
   a character string depository configured to store the first XML character string comprising the fixed SOAP message skeleton generated by the message analyzer unit and the second XML character string comprising the instance-constant variable generated by the message pre-composer unit; and
   a message composer unit configured to
      generate third XML character string comprising a dynamic variable, wherein the dynamic variable corresponds to at least one content set that varies in each SOAP message of the plurality of SOAP messages of the business process, wherein the third XML character string is generated prior to transmission of the SOAP message;

retrieve from the character string depository the first XML character string and the second XML character string; and generate a SOAP message based on concatenating all the first XML character string, the second XML character string, and the third XML character string, wherein the concatenating is completed prior to transmission of the SOAP message, wherein at least one of the units is part of a computer device having a memory and a processor.

6. The process engine apparatus according to claim 5, wherein the process engine apparatus is a Business Process Execution Language (BPEL) engine apparatus.

7. The process engine apparatus according to claim 5, wherein the SOAP message is divided into a first part for the fixed message skeleton and a second part for varying the process by means of a reference mechanism in the XML.

8. The process engine according to claim 5, wherein each of the XML character strings are generated based upon a Web Service Description Language (WSDL) file of a Web service to be invoked in the process.

* * * * *